United States Patent Office 3,297,913
Patented Jan. 10, 1967

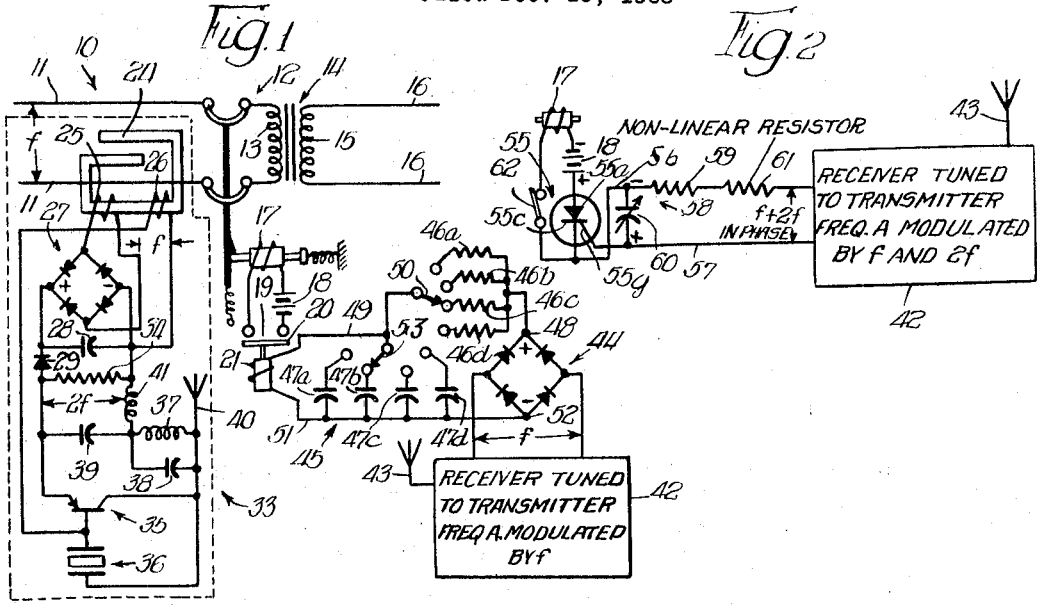

3,297,913
HIGH VOLTAGE CIRCUIT BREAKER CONTROL SYSTEM EMPLOYING WAVE TRANSMISSION MODULATED BY CURRENT FLOW IN CIRCUIT WITH TIME DELAY FOR OPERATING CIRCUIT BREAKER
Edmund O. Schweitzer, Jr., 1002 Dundee Road, Northbrook, Ill. 60062
Filed Dec. 13, 1963, Ser. No. 330,339
17 Claims. (Cl. 317—36)

This invention relates to protecting means for electric power systems and the like. It constitutes an improvement over the inventions disclosed in my U.S. Patents No. 2,724,821, issued November 22, 1955, No. 3,007,042, issued October 21, 1961, and No. 3,005,134, issued October 17, 1961, and my copending applications Serial No. 9,992, filed February 19, 1960, now Patent No. 3,197,702, issued July 27, 1965, Serial No. 253,100, filed January 22, 1963, now Patent No. 3,223,889, issued December 14, 1965, and Serial No. 302,197, filed August 14, 1963.

Among the objects of this invention are: To provide a predetermined time-current relationship between overcurrent flow in an electric power transmission circuit and the operation of circuit interrupting means in response thereto in a new and improved manner; to derive from the electric power transmission circuit a current flow that is a function of the current flow therein and to employ such derived current flow through wave transmitting means to operate the circuit interrupter means at a time determined by the time delay circuit means; to employ for the time delay circuit means variable impedance means; to derive from the electric power transmission circuit a flow of alternating current and its second harmonic and to apply the composite current flow to nonlinear impedance means for causing a current flow having a direct current component which is applied to the time delay circuit means for operating the circuit interrupter means; to provide for effecting the operation of the circuit interrupting means under the control of a normally non-conducting transistor in the form of a silicon controlled rectifier which is rendered conducting on predetermined current flow in the electric power transmission circuit at a time thereafter determined by the time delay circuit means; to employ radio transmitting and receiving means between the electric power transmission circuit and the control means for the circuit interrupting means; and to employ sound wave transmitting and receiving means between the electric power transmission circuit and the control means for the circuit interrupting means.

Other objects of this invention will, in part, be obvious and in part appear hereinafter.

In the drawing:

FIG. 1 is a circuit diagram showing how the present invention can be employed for overload protection in the event that a fault develops in the power system.

FIG. 2 is a circuit diagram that shows a modification of the circuit shown in FIG. 1.

FIG. 3 is a circuit diagram, similar to the circuit diagram of FIG. 1, but employing sound transmitting and receiving means instead of the radio transmitting and receiving means shown in FIG. 1.

FIG. 4 is a circuit diagram that shows a modification of the circuit shown in FIG. 3.

Referring now particularly to FIG. 1 of the drawing, it will be observed that the reference character 10 designates, generally, an alternating current electric power system which may operate at a frequency of 60 cycles per second and at a voltage ranging from 14.5 kv. to 500 kv. or more. This is indicated as being a frequency $f$. The electric power system 10 includes a power supply circuit represented by conductors 11—11. It will be understood that the power supply circuit 11—11 can be a single phase circuit or a polyphase circuit and that one of the conductors may be grounded in accordance with conventional practice. Also it will be understood that the system can be arranged for flow of direct current instead of alternating current with suitable modification as described in more detail in my copending application Serial No. 302,197, filed August 14, 1963. While the present invention will be described on the assumption that the current flow in the electric power system 10 is alternating current, it will be understood that, with suitable modification, the flow may be of direct current.

The power supply circuit 11—11 is connected by a normally closed circuit interrupter 12 to energize a primary winding 13 of a power transformer that is indicated, generally, at 14. The power transformer 14 may be either a single phase transformer or a polyphase transformer, depending upon whether the power supply circuit is a single phase or a polyphase circuit. The power transformer 14 includes a secondary winding 15 that is connected to energize a load circuit represented by conductors 16—16. Conventional trip means capable of being electrically operated are employed for controlling the opening of the circuit interrupter 12. Other equally conventional means are employed for closing the circuit interrupter 12. The trip means includes a trip winding or coil 17 that can be energized from any suitable source such as a battery 18. It will be understood that any other source available can be used and that energy for operating the trip means 17 can be derived from the load circuit 16—16, if desired. In the embodiment of the invention shown in FIG. 1, the trip circuit is completed by closure of normally open contacts 19 as the result of movement of a bridging contact 20 into engagement therewith. Any suitable means can be employed for operating the bridging contact 20. As illustrated, a relay winding 21 can be used for this purpose. The relay operated by the winding 21 may be a polarized relay when its operation depends upon the flow of a direct current component. Otherwise, it can be operable on alternating current.

The electric power system 10 and elements associated therewith that have just been described are common to the various circuit arrangements shown in the several figures of the drawings. It will be understood that they are conventional and that various modifications thereof can be made. Since the same elements are employed in the other figures, the same reference characters are applied thereto and the description thereof will not be repeated.

As pointed out in my copending application Serial No. 253,100, filed January 22, 1963, it is desirable that the relay winding 21 be energized under certain operating conditions of the electric power system 10. For example, in the event that the current flowing in the system exceeds a predetermined value or in the event of a short circuit, it is desirable that the relay winding 21 be energized for moving the bridging contact 20 into engagement with the contacts 19 to energize the trip coil 17 and permit the circuit interrupter 12 to open and disconnect the power supply circuit 11—11 from the power transformer 14 and the load circuit 16—16. As will appear hereinafter means are provided for effecting this operation a predetermined time after the overload or short circuit appears in the electric power system 10.

In order to provide a measure of the current flow in one of the conductors 11 a magnetic core 24 is provided with the conductor 11 extending therethrough so that it functions as a current transformer having a single turn primary winding. In this particular embodiment of the invention secondary windings 25 and 26 are provided on the magnetic core 24 and voltages are induced therein, as will be readily understood, which correspond to the magnitude of the current flowing in the power supply circuit 11—11. The secondary winding 25 is connected to energize a bridge type rectifier, shown generally at 27, the double frequency output of which, indicated at 2f, is applied across a capacitor 28. Depending upon the capacitance of the capacitor 28 the second harmonic 2f may or may not appear. In the embodiment of the invention shown in FIG. 1 the capacitance of the capacitor 28 is such as to shunt the output of the bridge type rectifier 27 to the end that only direct current is obtained therefrom for use in energizing a radio transmitter that is indicated, generally, at 33. The radio transmitter 33 is constructed generally as disclosed in my copending application Serial No. 9,992, filed February 19, 1960. When the current flow through the power supply circuit 11—11 attains a predetermined value, sufficient voltage is generated in secondary winding 25 and rectified by the bridge type rectifier 27 to cause a Zener diode 29 to break down and become conducting with the result that direct current flows through a resistor 34 for the purpose of placing in operation the radio transmitter 33. A potential appears across the terminals of the resistor 34 for energizing a transistor 35 and its circuit the frequency of which is controlled by a quartz crystal 36 which fixes the frequency of the carrier transmitted by the radio transmitter 33. The quartz crystal 36 may be selected to operate the radio transmitter 33 at any desired frequency. For example, it may be chosen to operate at a frequency of the order of 27.2 megacycles, this being in the band of frequencies that it is permissible to use for applications such as disclosed herein. If desired, other frequencies can be used. The frequency of the radio transmitter 33 also is controlled by an inductor 37 and capacitors 38 and 39 to the end that a signal is radiated by antenna 40. When the capacitance of the capacitor 28 is chosen so that the second harmonic from the bridge type rectifier 27 is suppressed, the carrier frequency of the radio transmitter 33 is modulated solely by a frequency f which is obtained from the secondary winding 26. The magnitude of the modulation is determined by the magnitude of the current flow in the power supply circuit 11—11.

It will be understood that the radio transmitter 33 is relatively small in size, is powered through the magnetic core 24 and can be constructed so as to form a unitary structure therewith that can be mounted readily on one of the conductors of the power supply circuit 11—11. Thus, advantage is taken of the insulation of the power supply circuit 11—11 and it is unnecessary to take any particular precautions with respect to the insulation of the link between the radio transmitter 33 and the trip coil 17 which can be located at ground potential.

Cooperating with the radio transmitter 33 is a radio receiver 42 of conventional construction that is tuned to the frequency of the transmitter 33 which is indicated as frequency A modulated by the fundamental frequency f. The radio receiver 42 has an antenna 43 to receive the signal that is radiated from the antenna 40 of the radio transmitter 33. The output of the radio receiver 42, which is in the form of the fundamental frequency f, is applied to a bridge type rectifier 44.

It is desirable that there be a predetermined relation between the current flow in the electric power system 10 and the time that the trip coil 17 is energized. Preferably this relationship is an inverse relationship in that the greater the magnitude of the current flow in the electric power system 10, the less time there should be for effecting the energization of the trip coil 17 and opening of the circuit interrupter 12. Such an inverse time current relationship is provided by a time delay circuit, indicated generally at 45, and comprising impedance means in the form of resistors 46a–b–c–d and capacitors 47a–b–c–d having different values. In order to provide a relatively short time delay the resistor selected should have a minimum value of resistance and the capacitor selected should have a minimum value of capacitance. It will be observed that the resistors 46a–b–c–d are connected in series between a terminal 48 of the bridge type rectifier 44 and a conductor 49 which is connected to one terminal of the relay winding 21. A selector switch 50 is employed for connecting the desired resistor 46a–b–c or d in the circuit. The capacitors 47a–b–c–d are commonly connected to a conductor 51 that interconnects the other terminal of the relay winding 21 and the opposite terminal 52 of the bridge type rectifier 44. They are arranged to be individually connected to the conductor 49 and thus across the circuit comprising the conductors 49 and 51 by a selector switch 53.

In operation the selector switches 50 and 53 are operated to select the particular one of the resistors 46a–b–c–d and the particular one of the capacitors 47a–b–c–d in accordance with the desired time current relationship between the flow of fault current in the power supply circuit represented by the conductors 11—11 and the time that it is desired to operate the circuit interrupter 12 to open the circuit. This relationship will be determined, in part, by other similar installations along the electric power system 10 requiring preferred sequential operation of other circuit interrupters as the case may be.

Under normal operating conditions the magnitude of the energizing voltage from the secondary winding 25 applied to the bridge type rectifier 27 is insufficient to cause the Zener diode 29 to break down. Accordingly, the radio transmitter 33 is not energized. Upon the occurrence of predetermined current flow in the power supply circuit represented by conductors 11—11, the voltage applied to the bridge type rectifier 27 is sufficient to break down the Zener diode 29. Accordingly, the radio transmitter 33 begins to function and to generate a carrier frequency under the control of the quartz crystal 36 which is modulated by the frequency f from the secondary winding 26. The frequency f appears at the output of the receiver 42 and is applied to the bridge type rectifier 44. The direct current output of the rectifier 44 then is applied through the time delay circuit, in this case an RC circuit, to the relay winding 21 which is energized in accordance with the time current characteristic of the time delay circuit 45. Contacts 19 are bridged and trip coil 17 is energized to effect opening of the circuit interrupter 12.

As pointed out above, by properly selecting the capacitance of the capacitor 28, it is possible to permit the flow of some second harmonic current indicated at 2f from the bridge type rectifier 27 when the Zener diode 29 is broken down under the circumstances above noted. When this action takes place, the carrier frequency of the radio transmitter 33 is modulated, not only by the fundamental frequency f but also by its second harmonic 2f, with the result that, as indicated in FIG. 2, the output of the radio receiver 42 is in the form of a composite current flow comprising the fundamental frequency f and its second harmonic 2f, preferably in phase.

In the embodiment of the invention shown in FIG. 2, instead of employing the relay with the contacts 19, bridging contact 20 and relay winding 21, a transistor in the form of a silicon controlled rectifier, indicated generally at 55, is employed. The silicon controlled rectifier 55 includes an anode 55a, a cathode 55c and a gate 55g. The anode 55a is connected to the positive terminal of the battery 18 while the cathode 55c is connected to one terminal of the trip coil 17. Also the cathode 55c is connected to a conductor 56 while the gate 55g is connected to another conductor 57, these conductors being connected to the output of the receiver 42 through an RC time delay circuit indicated at 58. The RC time delay circuit 58 includes a variable resistor 59 that is connected in series with the conductor 56 and a variable capacitor 60 that is connected between the conductors 56 and 57.

It will be understood that the variable resistor 59 is the equivalent of the various resistors 46a–b–c–d, shown in FIG. 1, and likewise that the variable capacitor 60 is the equivalent of the capacitors 47a–b–c–d there shown.

In order to obtain a direct current component from the output of the receiver 42 in the form of the composite alternating current comprising the fundamental frequency $f$ and its second harmonic $2f$, a non-linear resistor 61 is connected in series circuit relation with the variable resistor 59. As described in more detail in U.S. Patent No. 3,005,134, issued Oct. 17, 1961, when a fundamental and a second harmonic thereof are applied to a non-linear impedance device, such as the non-linear resistor 61, the current flow therethrough includes a direct current component the magnitude of which is a function of the magnitude of the fundamental and second harmonic. Advantage is taken of this effect for the purpose of applying the necessary positive control potential to the gate 55g to render the silicon controlled rectifier 55 conducting. When this takes place, energy from the battery 18 flows to the trip coil 17 for operating the circuit interrupter 12 shown in FIG. 1 of the drawings. The current continues to flow from the battery 18 to the trip coil 17 until a reset switch 62 is opened. When this occurs, the silicon controlled rectifier 55 no longer remains in the conducting state and, since the direct current component from the fundamental and second harmonic no longer is present, due to the opening of the circuit interrupter 12, the silicon controlled rectifier 55 remains in the non-conducting state and the reset switch 62 can be reclosed for the next operation.

Referring now particularly to FIG. 3 of the drawings, it will be observed that provision is made for tripping the circuit interrupter 12 through the transmission of energy in the form of sound waves from a location adjacent the high voltage power supply circuit 11—11 to the means at ground potential that is used for controlling the energization of the trip coil 17. It will be observed that the secondary winding 25 on the magnetic core 24 is arranged to energize series connected primary windings 63 and 64 of frequency triplers shown, generally, at 65 and 66. They are provided with series connected secondary windings 67 and 68 that are connected across a capacitor 69 with the secondary circuit and the capacitor 69 being tuned to resonance at the triple frequency or $3f$, i.e., 180 cycles per second, provided that the frequency of the power supply circuit 11—11 is 60 cycles per second.

The triple frequency or $3f$ is applied to a winding 70 of a loud speaker 71 to the end that sound waves indicated at 72 and having a frequency of $3f$ are transmitted through the air along a directed path to a receiver or microphone, shown generally at 73, having an output winding 74 that feeds into an amplifier 75 that may be of the push-pull type. The amplified output of the amplifier 75 in the form of the triple frequency, $3f$, is applied to a bridge type rectifier 76 to the output terminals of which conductors 78 and 79 are connected. The output of the bridge type rectifier 76 is applied by the conductors 78 and 79 to the relay winding 21 through an RC time delay circuit indicated, generally, at 80 which comprises a variable resistor 81 in series with the conductor 79 and a variable capacitor 82 connected across the conductors 78 and 79.

Interposed in the conductor 78 is a Zener diode 83 which prevents the flow of direct current to the RC time delay circuit and to the relay winding 21 until a predetermined direct voltage appears across the output terminals of the bridge type rectifier 76. This occurs when the flow of current in the power supply circuit 11—11 increases to a predetermined value sufficient to cause a corresponding magnitude in the sound waves $3f$ from the loud speaker 71 and applied to the receiver or microphone 73 to cause a sufficient voltage to appear across the output terminals of the bridge type rectifier 76 to break down the Zener diode 83. Then, depending upon the adjustments of the variable resistor 81 and variable capacitor 82, the relay winding 21 is energized at a predetermined time thereafter to move the bridging contact 20 into engagement with the normally open contacts 19 and complete the energizing circuit for the trip coil 17. The circuit interrupter 12 then is opened and the power supply circuit 11—11 is interrupted. When current flow ceases in the power supply circuit 11—11 the sound waves $3f$ as indicated at 72 no longer are applied to the receiver or microphone 73. The direct current output from the bridge type rectifier 76 ceases and the relay winding 21 is deenergized. The contacts 19 are opened and the trip coil 17 is deenergized.

FIG. 4 of the drawings shows a combination of the circuits illustrated in FIGS. 2 and 3. In order to provide the second harmonic of the triple frequency or $3f$ so as to provide a frequency of $6f$ a bridge type rectifier 84 is connected across the terminals of the capacitor 69. The output of the rectifier 84 is applied through a capacitor 85 to energize a primary winding 86 of a transformer that is indicated, generally, at 87. The transformer 87 has a secondary winding 88 that is connected in series with the winding 70 of the loud speaker 71. As indicated in FIG. 4 of the drawings, sound waves comprising fundamental frequency $3f$ and its second harmonic $6f$ are superimposed in phase and are transmitted as indicated at 72 through space to the receiver or microphone 73. The composite wave from the output winding 74 of the receiver or microphone 73 is applied to the amplifier 75 the output of which is indicated as comprising the fundamental frequency $3f$ and its second harmonic $6f$ in phase. This composite frequency is applied through a non-linear impedance device 89, such as a non-linear resistor, to the circuit comprising the conductors 78 and 79. The direct current component resulting from this arrangement is applied through the RC time delay circuit 80 and to the gate 55g of the transistor 55. When the magnitude of the direct current potential is sufficiently high, as when a predetermined current flows in the power supply circuit 11—11, the transistor 84 is rendered conducting and energizing current flows from the battery 18 through the reset switch 62 to energize the trip coil 17. When this occurs, the circuit interrupter 12 is tripped and the power supply circuit 11—11 is opened. The sound waves comprising the fundamental and second harmonic no longer are applied to the receiver or microphone 73 and the direct current component no longer flows in the circuit including the conductors 78 and 79. However, the trip coil 17 continues to be energized from the battery 18 until the reset switch 62 is opened. Then the trip coil 17 is deenergized and the transistor 55 returns to the non-conducting state.

What is claimed as new is:
1. An electric power transmission system comprising:
   (a) a power supply circuit and a load circuit,
   (b) circuit interrupter means interconnecting said circuits and trip means therefor,
   (c) means for deriving from said system an alternating current the magnitude of which corresponds to the magnitude of the current flow in said system,
   (d) means including a wave transmitter modulated by said derived alternating current and a wave receiver therefor providing an output corresponding to said derived alternating current,
   (e) means for deriving from said output of said wave receiver a current flow having a direct current component,
   (f) means responsive to said direct current component for operating said trip means to open said circuit interrupter means when said current flow in said system reaches a predetermined value, and
   (g) time delay circuit means interposed between said receiver and said trip means and responsive to said direct current component.

2. The invention, as set forth in claim 1, wherein the time delay circuit means includes:
(a) variable impedance means in shunt with the trip means, and
(b) variable impedance means in series with the trip means.

3. The invention, as set forth in claim 1, wherein the time delay circuit means includes:
(a) capacitance means in shunt with the trip means, and
(b) resistance means in series with the trip means.

4. The invention, as set forth in claim 1, wherein the trip means includes:
(a) a trip coil,
(b) a current source, and
(c) means for connecting said current source to said trip coil for energizing it.

5. The invention, as set forth in claim 4, wherein the means for connecting the current source to the trip coil includes a relay having contacts and a winding for controlling said contacts.

6. The invention, as set forth in claim 4, wherein the means for connecting the current source to the trip coil includes a normally non-conducting transistor rendered conducting in response to the direct current component.

7. The invention, as set forth in claim 6, wherein the transistor is a silicon controlled rectifier.

8. An electric power transmission system comprising:
(a) a power supply circuit and a load circuit,
(b) circuit interrupter means interconnecting said circuits and trip means therefor,
(c) means for deriving from said system an alternating current the magnitude of which corresponds to the magnitude of the current flow in said system,
(d) means including a wave transmitter modulated by said derived alternating current and a wave receiver therefor providing an output corresponding to said derived alternating current,
(e) means for applying said output of said receiver to said trip means and including a normally non-conducting transistor for operating said trip means by being rendered conducting to open said circuit interrupter means when said current flow in said system reaches a predetermined value.

9. The invention, as set forth in claim 8, wherein the transistor is a silicon controlled rectifier.

10. The invention, as set forth in claim 1, wherein the wave transmitter is a radio transmitter and the wave receiver is a radio receiver tuned thereto.

11. The invention, as set forth in claim 10, wherein the radio transmitter operates at the potential of the system and includes a transmission oscillator having a frequency control circuit with a crystal therein for generating a predetermined transmission frequency.

12. The invention, as set forth in claim 1, wherein the wave transmitter is a sound transmitter and the wave receiver is a sound receiver.

13. The invention, as set forth in claim 12, wherein the wave transmitter includes a frequency multiplier whereby the frequency of the transmitted sound is a multiple of the frequency of the alternating current.

14. The invention, as set forth in claim 12, wherein:
(a) the wave transmitter includes means for transmitting a composite sound wave containing a fundamental and its second harmonic, and
(b) the wave receiver includes means for converting the composite sound wave into a composite alternating current flow containing a corresponding fundamental and second harmonic and applying the same through non-linear impedance means and the time delay circuit means to operate the trip means and open the circuit interrupter means.

15. The invention, as set forth in claim 1, wherein:
(a) the wave transmitter includes means for transmitting a composite wave containing a fundamental and its second harmonic, and
(b) the wave receiver includes means for converting the composite wave into a composite alternating current flow containing a corresponding fundamental and second harmonic and applying the same through non-linear impedance means and the time delay circuit means to operate the trip means and open the circuit interrupter means.

16. The invention, as set forth in claim 15, wherein:
(a) the electric power transmission system is an alternating current system,
(b) the wave transmitter is a radio transmitter and the wave receiver is a radio receiver tuned to said radio transmitter, and
(c) the radio transmitter is modulated by alternating current derived from said system and its second harmonic.

17. The electric power transmission system of claim 1 wherein means are provided for directing energy in wave form from said transmitter to said receiver along a predetermined path having a limited transverse dimension.

References Cited by the Examiner
UNITED STATES PATENTS

| | | | |
|---|---|---|---|
| 3,155,879 | 11/1964 | Casey et al. | 317—33 |
| 3,181,032 | 4/1965 | Myers | 317—142 X |
| 3,206,652 | 9/1965 | Monroe | 317—151 X |
| 3,223,889 | 12/1965 | Schweitzer | 317—14 |
| 3,252,070 | 5/1966 | Medlar et al. | 317—142 X |

MILTON O. HIRSHFIELD, *Primary Examiner.*

R. V. LUPO, *Assistant Examiner.*